(12) United States Patent
Marshall et al.

(10) Patent No.: US 8,554,738 B2
(45) Date of Patent: Oct. 8, 2013

(54) MITIGATION OF OBSOLESCENCE FOR ARCHIVAL SERVICES

(75) Inventors: Catherine Claire Marshall, San Francisco, CA (US); Yan Leshinsky, Kirkland, WA (US); Elissa Murphy, Seattle, WA (US); Navjot Virk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 12/408,006

(22) Filed: Mar. 20, 2009

(65) Prior Publication Data
US 2010/0241615 A1 Sep. 23, 2010

(51) Int. Cl.
*G06F 7/00* (2006.01)
(52) U.S. Cl.
USPC ............ 707/661; 707/809; 715/202; 715/738
(58) Field of Classification Search
None
See application file for complete search history.

(56) References Cited

U.S. PATENT DOCUMENTS

| | | | |
|---|---|---|---|
| 6,560,618 B1 | 5/2003 | Ims | |
| 6,567,828 B2 * | 5/2003 | Inohara et al. | 707/809 |
| 7,065,588 B2 * | 6/2006 | Konda et al. | 709/246 |
| 7,136,857 B2 * | 11/2006 | Chen et al. | 1/1 |
| 7,191,197 B2 * | 3/2007 | Mashima | 1/1 |
| 7,284,017 B2 | 10/2007 | Baune | |
| 7,589,847 B2 * | 9/2009 | Jurkowski et al. | 358/1.13 |
| 8,082,322 B1 * | 12/2011 | Pascarella et al. | 709/218 |
| 2002/0178439 A1 | 11/2002 | Rich et al. | |
| 2006/0143340 A1 * | 6/2006 | Labar | 710/62 |
| 2006/0271849 A1 * | 11/2006 | Thormaehlen | 715/523 |
| 2007/0140575 A1 * | 6/2007 | Bai et al. | 382/244 |
| 2007/0150480 A1 * | 6/2007 | Hwang et al. | 707/10 |
| 2007/0204266 A1 * | 8/2007 | Beaty et al. | 718/1 |
| 2007/0288535 A1 * | 12/2007 | Shitomi et al. | 707/204 |
| 2008/0262996 A1 | 10/2008 | Yogeshwar et al. | |
| 2010/0191854 A1 * | 7/2010 | Isci et al. | 709/226 |

OTHER PUBLICATIONS

Lubeck, et al., "An Overview of a Large-Scale Data Migration", In Proceedings of the 20th IEEE/11th NASA Goddard Conference on Mass Storage Systems and Technologies, Apr. 7, 2003, pp. 49-55.

* cited by examiner

*Primary Examiner* — Fred I Ehichioya
*Assistant Examiner* — Hasanul Mobin
(74) *Attorney, Agent, or Firm* — Tracy Powell; Powell IP Law, PLLC

(57) ABSTRACT

The claimed subject matter relates to an architecture that can determine costs associated with updating file formats. In particular, the architecture can interface with a network-accessible data storage service in order to determine a cost-benefit to the data storage service for a wide variety of conversion scenarios applicable to the particular topology of the data storage service. For example, the cost-benefit can differ for storage services configured according to a client-server model relative to storage services configured according to a distributed topology. Regardless, the architecture can identify a legacy format, select a converter for converting the legacy format to the updated format, and then determine the cost-benefit for a variety of conversion or migration scenarios.

20 Claims, 11 Drawing Sheets

MITIGATION OF OBSOLESCENCE FOR ARCHIVAL SERVICES

BACKGROUND

Since the launch of the computer revolution decades ago, data has been steadily migrated or been duplicated to exist in electronic or digital form. Today, a very significant portion of personal or other information about many individuals or other entities exists in this form, and those individuals or entities have come to rely on the utility and convenience of computer-based data storage, since these data stores can be accessed by way of computer networks.

Given this growth and the convenience of computer-based archival storage of data, numerous data storage services have entered the marketplace. These data storage services typically host or maintain the data associated with the user in exchange for a service fee. While no data storage service has yet been able to guarantee perpetual archival storage of client data, these services do provide the capabilities to store data for a very long time. Over that time, it is conceivable that file formats of files included in the archive will become obsolete. Similarly, users themselves can also store data for a very long time, during which that associated data can become obsolete. Losing the ability to interpret the bits or bytes of the data can be the effective equivalent of losing the data itself.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can determine costs associated with updating file formats. In accordance therewith and to other related ends, the architecture can interface with a network-accessible data storage service that facilitates archival of data associated with a user as well as retrieval of archived data. In addition, the architecture can examine the archived data or monitor archival or retrieval transactions in order to identify a legacy file that is formatted in a legacy format (e.g., an old, obsolete, or volatile file format). Hence, the legacy file can be identified when the user requests a archival or retrieval transaction or as previously existing in the archived data (even without an associated transaction). Once the legacy file is identified, the architecture can select a converter from among a set of converters, wherein the converter can be employed for conversion or migration of the legacy file to an updated file with an updated file format.

In addition, the architecture can determine a respective cost-benefit to the data storage service for each of a plurality of conversion scenarios directed to utilizing the converter for migration or conversion, where migration is directed to replacing the legacy file with the updated file, while conversion is directed to constructing the updated file that is distinct from and/or non-destructive to the legacy file. It should be appreciated that the data storage service can be configured as a distributed network with a set of peers, wherein multiple peers from the set of peers each stores a respective portion of the archived data. Appreciably, in that case, the cost-benefit can be different relative to, say, a client-server model where the data storage service maintains the data in an associated data repository.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
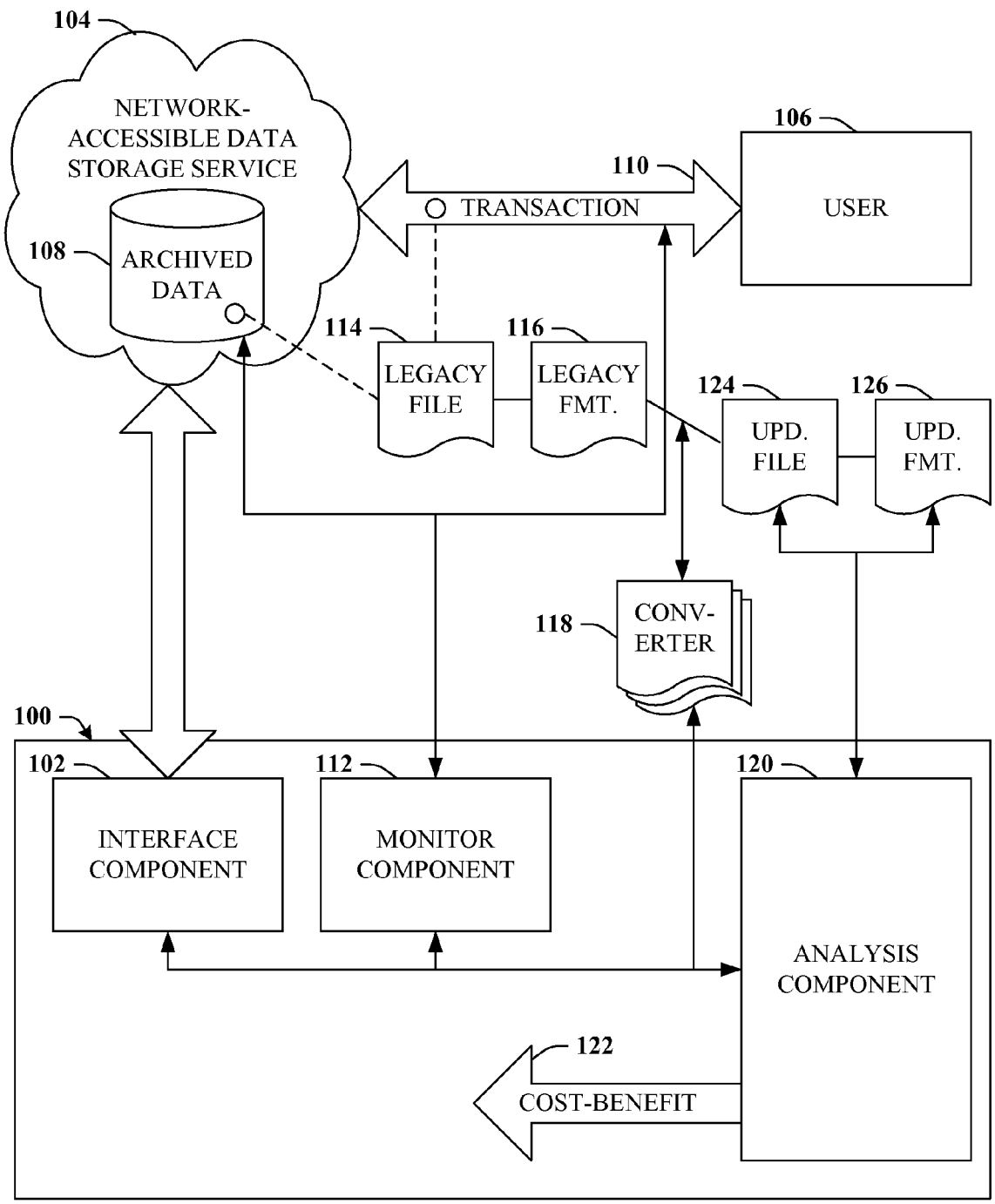
FIG. 1 illustrates a block diagram of a computer-implemented system that can determine costs associated with updating file formats.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can determine costs associated with updating file formats is depicted. Generally, system 100 can include interface component 102 that can interface with network-accessible data storage service 104. Data storage service 104 can facilitate archival of data associated with customers or clients (e.g., user 106) of data storage service 104 as well as retrieval of any such archived data 108 by user 106. Both archival or retrieval of archived data 108 are labeled and referred to herein as transactions 110, which can generalize other transactions associated with archived data 108 as well, such as on-demand conversion or migration requested by user 106 and so forth. Moreover, it should be understood that data storage service 104 can be constructed to operate according to very particular networking configurations or topologies, which are discussed infra in connection with FIG. 2. Appreciably, interface component 102 (as well as other components described herein) can be configured in a distinct or specific manner based upon the configuration of data storage service 104.

Figure 2:
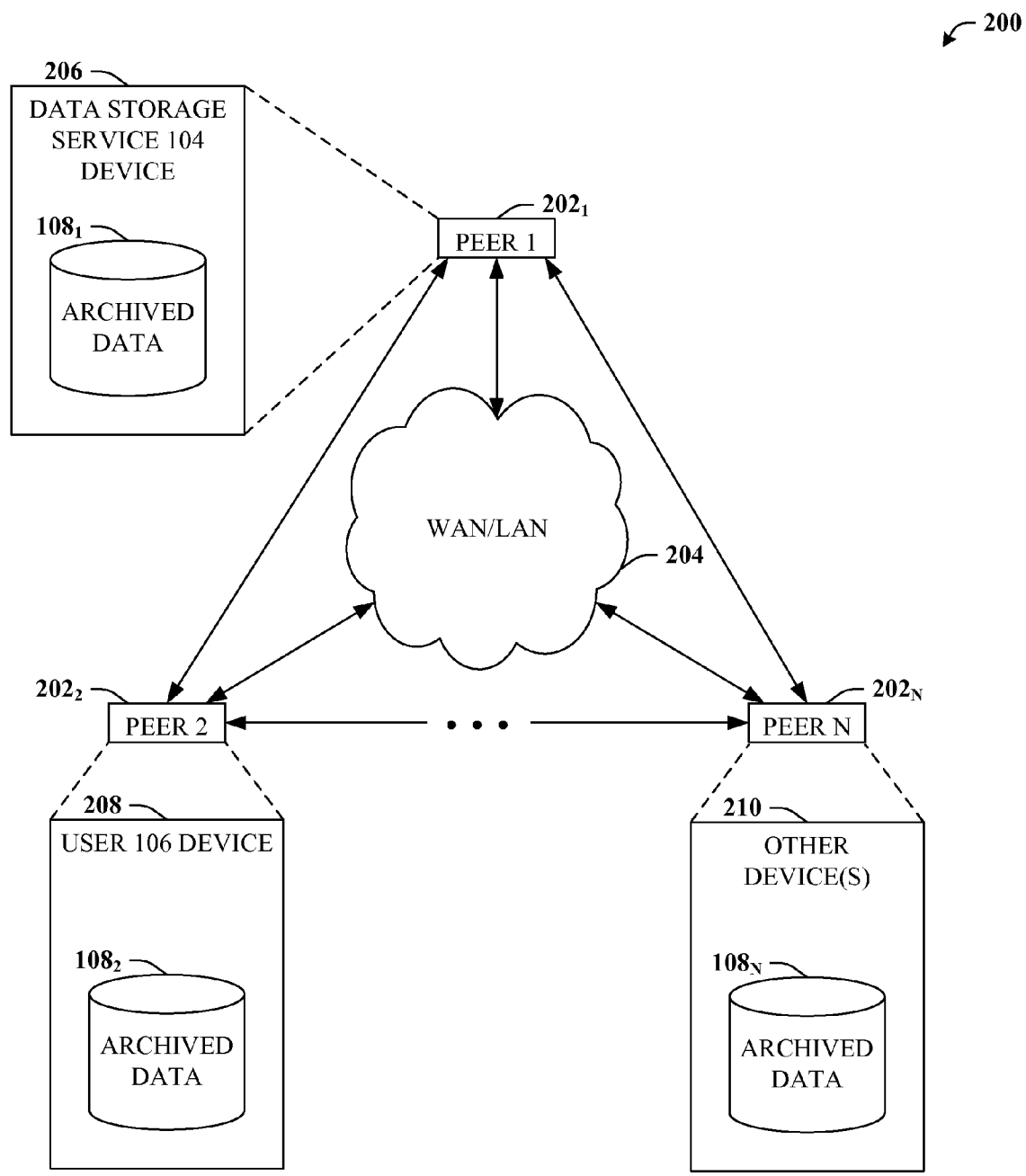
FIG. 2 depicts a diagram that depicts an example topology to which data storage service 104 conforms.

While still referring to FIG. 1, but turning now also to FIG. 2, diagram 200 depicts an example topology to which data storage service 104 conforms. In particular, in one or more aspects of the claimed subject matter, data storage service 104 can be configured as a distributed network and/or a mesh network. More specifically, the mesh or distributed network can include multiple peers, denoted here as peers $202_1$-$202_N$, where N can be substantially any integer. Each peer 202 can be connected to other peers 202, by way of any suitable connectivity scheme or architecture such as a wide area network (WAN) or a local area network (LAN), labeled here as WAN/LAN 204. The mesh network can be a full mesh network in which every peer 202 is connected to all other peers 202. Alternatively, the mesh network be configured according to a partial mesh topology in which one peer 202 can be connected to all other peers 202, while a second peer 202 is connected only to a subset of all other peers 202, typically only the peers 202 in which the second peer 202 communicates with the most or exchanges the most data.

Each peer 202 can represent a node in the mesh network (or another distributed network) and can be physically implemented by a server, workstation, personal computer, laptop, game console, phone, personal digital assistant (PDA), or substantially any other suitable device. Moreover, regardless of the type of device that constitutes a given peer 202, that peer 202 can store all or a portion of archived data 108. In other words, multiple peers 202 can each store a respective portion of archived data 108. In some cases, each portion of archived data (labeled archived data $108_1$-$108_N$) can be mutually exclusive (e.g. no file included in archived data 108 exists on more than one peer 202), while in other cases each portion can be unique (e.g., the set of files included in each portion of archived data 108 is unique even though multiple peers 202 can include the same file), while in still other cases substantially identical file sets can be included on multiple peers 202 or devices associated therewith.

Furthermore, regardless of the networking topology, it should be appreciated and understood that any portion of archived data 108 hosted by peer 202 can reside not only on the peer 202 proper, but also on devices attached to or inserted in that peer 202. For example, consider a CD-ROM drive (e.g., attached device) associated the user's laptop (e.g., peer 202). Monitor component 112 can facilitate a query of the drive to determine that a disc is present in the drive and further determine the disc includes data in a legacy format. Such legacy data can be converted or migrated as substantially described herein with updated file(s) 124 stored, e.g. to the disc of the attached drive, to the host peer 202 or another peer 202, or to data storage service 104. Appreciably, the above can be used in connection with an on-demand conversion or migration feature accomplished by way of transaction 110.

Regardless of whether or not data storage service 104 is implemented according to a distributed networking topology, data storage service 104 can, according to one or more aspects, maintain a network-accessible data repository that stores or hosts at least a portion of archived data 108. Thus, one example device that embodies a peer 202 can be device 206 illustrated as an example for peer 202$_1$. Likewise, one or more peers 202 can be embodied by a device 208, which can be, e.g., a home computer or laptop associated with user 106, as illustrated in connection with peer 202$_2$. Moreover, other devices 210 that are not directly associated with user 106 or data storage service 104 can embody a peer (e.g., peer 202$_N$) as well. For example, peers 202 can be hosted by contacts of user 106 or members of a community associated with user 106 or data storage service 104.

It should be appreciated that example depicted for each peer 202$_1$-202$_N$ are intended to be exemplary in nature, and need not necessarily be representative of ordering or a constituent composition of peers 202. Moreover, data storage service 104 need not in all aspects maintain any data repository at all. For example, peers 202 need not include data storage service 104 and all archived data 108, regardless of the apportionment, can be stored by other devices or data stores, even if at least transactions 110 are managed by data storage service 104.

Continuing the discussion of FIG. 1, system 100 can further include monitor component 112 that can perform a variety of examination and monitoring tasks. For example, in accordance with one or more aspects of the claimed subject matter, monitor component 112 can scan or examine archived data 108, which can be accomplished irrespective of whether or not data storage service 104 hosts devices in which archived data 108 is stored or archived data 108 is distributed amongst a set of peers 202. Additionally or alternatively, monitor component 112 can scan or monitor transactions 110 between data storage service and user 106 such as, e.g. archival or retrieval transactions.

Based upon the above-mentioned scans of either archived data 108 or transactions 110, monitor component 112 can further identify legacy file 114. Identification of legacy file 114 can be based upon detection of a given file that is configured in legacy format 116. Thus, any file detected that is constructed in legacy format 116 can be identified as legacy file 114. Legacy format 116 will typically be a format that is old, obsolete, or volatile, wherein volatile formats have a history of or are inferred to result in numerous or quickly evolving adaptations or declining proliferation of legacy format 116 or an associated interpreter mechanism. Monitor component 112 can identify file formats (e.g. legacy format 116) of a file by way of examining headers or metadata associated with the file, sampling a portion of data included in the file, examining the file name and so forth; and then comparing the results with, e.g., a file format index (not shown).

Once legacy format 116 has been identified, monitor component 112 can also select converter 118 from a set of converters. Although depicted as separate entities, the set of converters can be included in system 100 or included in archived data 108 (either local to data storage service 104 or distributed) or a specific data repository associated with data storage service 104, or maintained elsewhere or by another entity. The set of converters is further detailed infra, but as a brief introduction, converter 118 selected by monitor component 112 can be employed to convert or transform legacy file 114 to a different format, typically one that is newer or that provides various other benefits to user 106 and/or data storage service 108. Moreover, monitor component 112 can select converter 118 by way of a multi-pass selection processor, where many most suitable converters from the set are initially selected, and an optimal converter 118 is selected from amongst the most suitable converters.

System 100 can also include analysis component 120 that can determine a respective cost-benefit 122 for each of a plurality of conversion scenarios, wherein each conversion scenario is directed to utilizing converter 118 for migration or conversion of legacy file 114 into updated file 124 that is configured according to updated format 126. It should be appreciated that while legacy format 116 can relate to an old, obsolete, or extremely volatile formats, updated format 126 can relate to a current or a recent version of legacy format 116. However, this need not necessarily always be the case. Rather, updated format 126 can be related only in terms of a broad category, classification, or domain, yet remain substantially unrelated in terms of a specific vendor or application.

For instance, in the case where legacy format 116 is an audio format, updated format 126 will typically be an audio format as well, even if not from the same vendor or provider. Moreover, it should be appreciated that in one or more aspects, updated format 126 need not necessarily be a new or modern format. Rather, updated format 126 can be a simple format that is, or has interpretation mechanisms (e.g., components that decode or interpret raw data bits or bytes) that are, ubiquitous and/or has historically shown robust longevity or is inferred to attain robust longevity and remain so. For example, consider the case in which legacy format 116 is configured according to an old version of a particular software vendor's flagship word processor. In that case, updated format 126 can be the new version of that word processor format, yet updated format 126 can also be plain text, as plain text has historically been around much longer than the word processor format, has nearly universal dissemination of suitable interpreter mechanisms, and is likely to outlast the most recent version of the word processor format.

Furthermore, it should be appreciated that, typically, migration of legacy file 114 relates to overwriting or replacing legacy file 114 with updated file 124 such that legacy file 114 will no longer exist in archived data 108 (e.g., in cases where legacy file 114 is identified in archived data 108 or identified during a retrieval transaction 110) or will not be stored to archived data 108 (e.g., in cases where legacy file 114 is identified during an archival transaction 110). Rather, in both cases, migration will either replace legacy file 114 with updated file 124 within archived data 108, or store updated file 124 to archived data in lieu of storing legacy file 114.

On the other hand, conversion of legacy file 114 generally relates to constructing updated file 124 that is distinct from legacy file 114 and/or in a manner that is non-destructive of legacy file 114, which can include at least two disparate cases. In particular, in one or more aspects of the claimed subject matter, analysis component 120 can facilitate a conversion of legacy file 114 to updated file 124 such that both legacy file 114 and updated file 124 are maintained in archived data 108, generally in association with one another. In that case, subsequent retrieval transactions 110 can be directed to either legacy file 114 or updated file 124, but will generally recall updated file 124, which can then be retrieved without employing converter 118. In one or more alternative aspects, analysis component 120 can facilitate a conversion of legacy file 114 to updated file 124 while discarding updated file 124 after completion of a retrieval transaction 110. In the latter situation, archived data 108 need not maintain updated file 124, yet subsequent retrieval transactions 110 can require that legacy file 114 is converted once more by converter 118 or a subsequently selected converter 118 from the set of converters.

Regardless of whether migration or conversion is chosen for a particular legacy file 114 or in the case of conversion whether or not updated file 124 is maintained or discarded, it should be appreciated that related operations useful or necessary to efficiently or accurately accomplish the migration or conversion can differ for distributed network topologies of data storage service 104 over, say, a client-server model where all data resides on a repository maintained by data storage service 104. Thus, when data storage service 104 is implemented in a distributed fashion, components described herein can account for these distinctions. For example, in the case of a distributed topology, it can be envisioned that user 106 can perform various transaction 110 (e.g., retrieval) upon archived data 108. Hence, legacy files 114 included in this archived data 108 can be converted (either by way of conversion or migration) to updated files 124 even without user 106 or an associated device being aware of the location of legacy file 114 (or any other file included in archived data 108). Appreciably, conversion utilities instantiated from a user device cannot accomplish these and other features.

It should be further appreciated that in addition to determining cost-benefit 122 for each of various conversion scenarios (whether migration or conversion) in connection with the selected converter 118, analysis component 120 can further determine cost-benefit 122 for a plurality of conversion scenarios with respect to other converters 118 included in the set of converters. Regardless, the set of conversion scenarios can include a wide variety of cases, many examples of which are provided in connection with FIG. 3A, while numerous examples of parameters or factors associated with determination of cost-benefit 122 are described with reference to FIG. 3B.

Figure 3A:
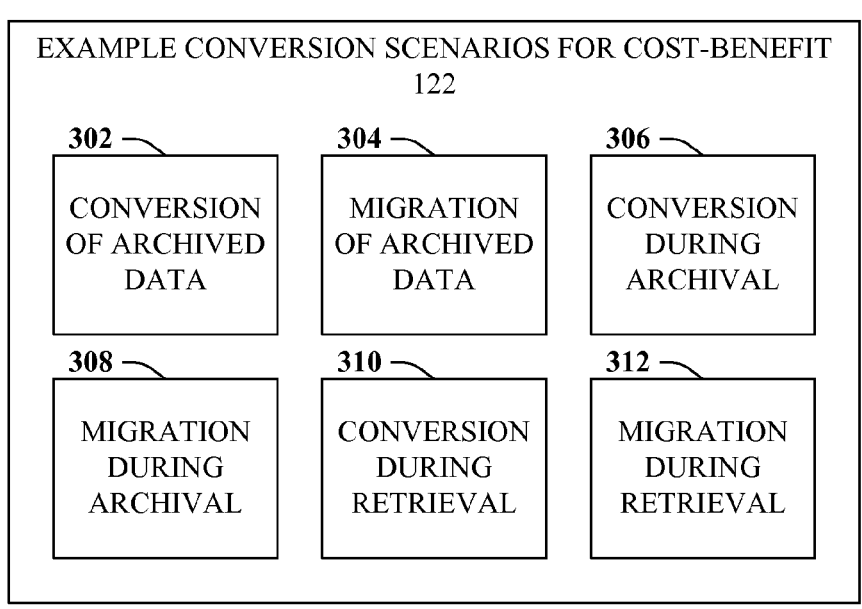
FIG. 3A provides block diagram that depicts numerous example conversion scenarios for determination of cost-benefit 122.
Figure 3B:
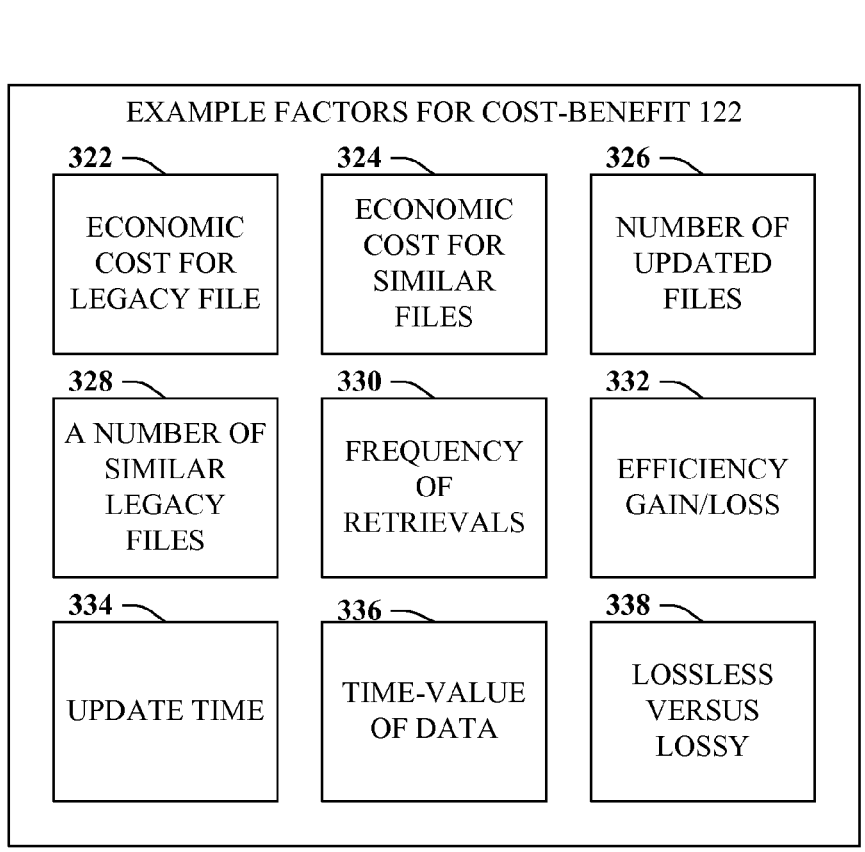
FIG. 3B is a block diagram that illustrates a variety of example factors or parameters in connection with determining cost-benefit 122.

While still referring to FIG. 1, but turning simultaneously to FIGS. 3A and 3B, FIG. 3A provides block diagram 300 that depicts numerous example conversion scenarios for determination of cost-benefit 122, whereas FIG. 3B provides block diagram 320 that illustrates a variety of example factors or parameters in connection with determining cost-benefit 122. It should be understood that the examples provided herein are intended to help readily identify practical or conceptual aspects in connection with the claimed subject matter in a manner that is concrete. However, the claimed subject matter need not necessarily be limited to the provided examples as other examples can be suitable and still be within the scope of the appended claims.

Referring specifically to diagram 300, many of the examples provided have been introduced above, but are now further detailed. For instance, one example scenario included in the plurality of conversion scenarios can be the case in which conversion of legacy file 114 to updated file 124 is accomplished when monitor component 112 identifies legacy file 114 within archived data 108. Likewise, another conversion scenario can be the case in which migration of legacy file 114 to updated file 124 is accomplished when monitor component 112 identifies legacy file 114 within archived data 108. These two examples are labeled by reference numeral 302 and 304, respectively, and, irrespective of whether conversion or migration is sought, these two scenarios will typically arise based upon examination of archived data 108, potentially even without any transactions 110.

Similarly, reference numeral 306 relates to conversion of legacy file 114 to updated file 124 whereas reference numeral 308 relates to migration of legacy file 114 to updated file 124, yet is applicable, e.g., when monitor component 112 identifies legacy file 114 during an archival transaction 110. Thus, in either situation, analysis component 120 can facilitate creation of updated file 124 prior to storing the associated data in response to the archival transaction. More particularly, conversion 306 can relate to storing both legacy file 114 and updated file 124, while migration 308 can relate to storing only updated file 114.

Next to be described, conversion 310 and migration 312 relate to the example scenarios in which legacy file 114 is converted to updated file 124 when monitor component 112 identifies legacy file 114 during a retrieval transaction 110, which, unlike scenarios relating to archival (e.g., 306 and 308), can invoke both types of conversion as well as migration. As with scenarios relating to archival, migration 312 can overwrite or replace legacy file 114 with updated file 124 in archived data 108, generally presenting updated file 124 to satisfy the retrieval request. Also like scenarios relating to archival, in the case of conversion 310, updated file 124 can be stored, potentially indexed or referenced to the associated legacy file 114. However, in the retrieval scenario, updated file 124 can also be discarded after access (since it can be readily recreated by way of converter 118), a scenario that typically is not applicable to archival transactions.

Referring now specifically to diagram 320, it should be recalled that analysis component 120 can determine respective cost-benefits 122 associated with updated file 124 according to a variety of conversion scenarios, examples of which were detailed supra in connection with FIG. 2A. Thus, example factors are now provided by way of reference numerals 322-338, all or a portion or other factors can be employed for determining cost-benefits 122, and can be utilized in substantially any order or combination. In particular, an economic cost associated with migration or conversion of legacy file 114 to updated file 124, which is denoted by reference numeral 322. Economic cost 322 can relate to the costs associated with resource utilization, storage space for one or both legacy file 114 or updated file 124 as well as the costs of maintaining converter 118 employed to create updated file 124.

It can be readily appreciated that the ability to update data associated with user 106 can be especially useful for data storage service 104. For instance, conventional data storage services are steadily evolving toward long-term storage and maintenance of data for their clients. Appreciably, over that time, and especially in light of a rapidly evolving industry, it is reasonably conceivable that file formats for data stored by these services will become obsolete. Thus, providing the tools necessary to automatically and/or seamlessly update the archived data can be quite beneficial to the data storage services as well as their clients. Moreover, given the proliferation of electronic or digital media and the rapidly evolving industry as a whole, clients might even want to archive data that is long outdated.

Regardless, while it is readily apparent that formats can become outdated or obsolete over time, it should also be appreciated that the tools necessary to update legacy files can also become outdated or obsolete. In other words, e.g. just as a data file can outlive the application that created the data file, the data file can also outlive the operating system (or other operation elements) employed to execute the application. Thus, economic cost 322 can relate not only to the costs of maintaining a particular converter or series of converters, but also to the costs of maintaining applications necessary to properly run converters as well as operating systems (or portions thereof) or emulators necessary to run these applications or converters. In fact, a library of platform emulators can be maintained to aid some or all converters 118 discussed. The examples provided in connection with economic cost 322 can also be applicable to cases in connection with reference numeral 324, which relates to an economic cost associated with migration or conversion of other legacy files included in archived data 108 with a substantially similar format as legacy file 114.

In particular, cost-benefit 122 can be adjusted when numerous files other than just legacy file 114 are formatted according to legacy format 116. For example, conversions or migrations can be performed in bulk in some cases, which might be more cost-effective than otherwise or provide additional benefits. Such aspects are also described by reference numeral 328. Likewise, with respect to reference numeral 326, cost-benefit 122 can relate to a number of other updated files (e.g., files other than updated file 124) included in archived data 108 with a substantially similar format (e.g. updated format 126) as updated file 124. For example, if many files in archived data 108 are already formatted in updated format 126, it can be beneficial to convert legacy files 114 to that format, since, inter alia, costs associated with maintaining relevant converters or other operating elements might therefore be reduced.

Moreover, the above can be a factor in which particular converter 118 is selected by monitor component 112, since even if it is already understood that there is a positive cost-benefit 122 associated with converting legacy file 114, the particular updated format 126 to which to convert can be determined to maximize cost-benefit 122, e.g. by selecting updated format 126 consistent with many files included in archived data 108 over an updated format 126 that has fewer similar files in archived data 108.

Another example of factors relating to determination of cost-benefit 122 is provided in connection with reference numeral 330. In particular, factors can be applied in connection with a historical or inferred frequency of retrieval transactions associated with legacy file 114. For example, if it is likely (or has been the case historically) that legacy file 114 is referenced often, then a decision in favor of maintaining updated file 124 can be more efficient than repeatedly recreating updated file 114, potentially on the fly, in response a retrieval transaction 110.

In addition, cost-benefit 122 can be determined based upon an efficiency change for migration relative to conversion, or vice versa, as denoted by reference numeral 332. For instance, drawing from the previous example, if legacy file 114 is rarely accessed, conversion might be more efficient if done on the fly upon a retrieval transaction 110, or done once with the updated file 124 archived along with legacy file 114. However, in other cases, it could be determined to be more efficient to effectuate full migration, where only updated file 124 need be maintained, such as in the case where conversions require many intermediate steps (e.g. multiple converters 118 are necessary to transform legacy file 114 to a most recent updated file 124).

Another example factor for determining cost-benefit 122 can relate to update time 334. Update time can reflect a time required for migration or conversion of legacy file 114 or the other legacy files (e.g., those with legacy format 116). Again, especially in the case of multi-step conversion situations, conversion or migration can be a relatively resource-intensive process, yet can potentially be accounted for by cost-benefit 122.

Still another example factor for determining cost-benefit 122 can relate to time-value 336 of data included in legacy file 114. Appreciably, data, as with many assets or resources can decline or depreciate over time. For example, data relating to an itinerary generally has significantly less value after events detailed therein have come to pass relative to when those events are still forthcoming. While this is only one specific example, it should be appreciated that other examples can exist and, moreover, knowledge of the type of data (e.g., knowledge that the data relates to an itinerary in the above example) is not strictly necessary, but can in some cases be derived from formats 116, 126 or examination of files 114 124 and employed. Regardless, a general time-value function can be applied in connection with legacy file 114 or archived data 108 to ascertain cost-benefit 122 associated with migration or conversion when the value of data depreciates over time. Additionally or alternatively, the time-value function can also include aspects relating to frequency of retrievals 330. For example, frequent retrieval transactions 110 associated with a particular file 114, 124 can indicate a higher data value in spite of passage of time. Certainly the mere fact certain data has not been or only infrequently accessed does not in all cases imply a low value for the data, but the reverse situation (frequent accesses) can imply a high or higher value in accordance with the time-value function.

Furthermore, cost-benefit 122 can be derived at least in part from an inference associated with a longevity of updated format 126. For example, updated format 126 that is determined or inferred to be a significant improvement over legacy format 116, or one that is widely used by many devices or applications (e.g., interpreter mechanisms), or that maintains a significant market share for a particular domain can all be indicative of a benefits that can be derived from migration or conversion of legacy file 114. As yet another example, cost-benefit 122 can be derived based upon whether updated file 124 is lossless or lossy with respect to the legacy file 114. For instance, in the case of lossy transformations, conversion operations (e.g., those that maintain legacy file 114) might be more desirable, whereas in the case of lossless transformation, migration operations can have a higher relative cost-benefit 122. As another example, consider the previously mentioned illustration in which legacy file 114 is formatted according to an old word processor format and the updated file 124 is in plain text format. In that or a similar case, updated format 126 (e.g., plain text) will be lossy in terms of page and character formatting or the like, yet the value of the text is likely to be significantly greater than the value of fancy formatting characteristics provided by the old (or a newer) word processing format. Hence, although lossy, an associated conversion or even migration can yield a high or positive cost-benefit 122.

Figure 4:
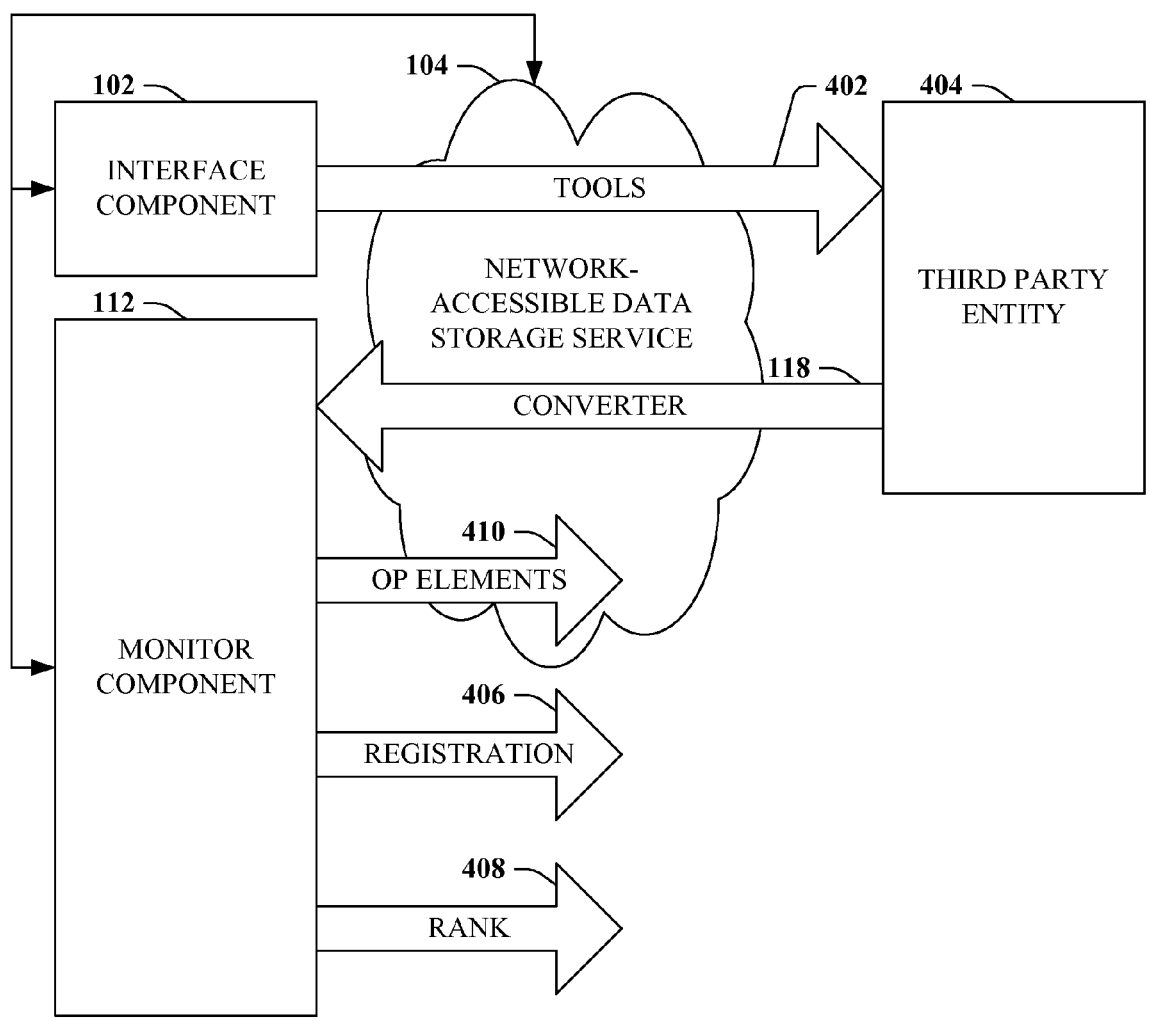
FIG. 4 depicts a block diagram of a system that illustrates additional features or aspects relating to determining costs associated with updating file formats.

Turning now to FIG. 4, system 400 that illustrates additional features or aspects relating to determining costs associated with updating file formats is provided. In general, system 400 can include interface component 102 that can interface with a network-accessible data storage service 104 that facilitates archival of data associated with user 106 and retrieval of that archived data 108 as substantially described supra. In addition, in one or more aspects of the claimed subject matter, interface component 102 can expose a set of tools 402 to third party 404. Such tools 402 can, e.g., be related to an extensibility model and/or be a set of API's exposed to, e.g. independent software vendors (ISVs) or another third party entity 404. Moreover, tools 402 can be configured to facilitate design of one or more converters such as converter 118 or other converters included in the set of converters discussed in connection with FIG. 1. Appreciably, converters designed by third party entity 404 can produce updated file 124 from legacy file 114 in accordance with or in a manner that conforms to the particular architecture of data storage service 104, e.g., to provide for conversion or migration in a distributed environment.

Accordingly, the set of converters from which monitor component selects converter 118 can be comprised of converters designed by third parties, as well as converters designed by data storage service 104. In one or more aspects of the claimed subject matter, irrespective of when or by whom a particular converter 118 is created, monitor component 112 can register 406 converter 118, e.g., when adding converter 118 to the set of converters. Furthermore, in one or more aspects, monitor component 112 can assign rank 408 to all or a portion of converters that compose the set of converters. Rank 408 can be determined based upon respective cost benefits 122 associated with each converter. In other words, factors employed for determining cost-benefit 122 can be utilized for determining rank 408 in a similar manner. In addition, rank 408 can be assigned within particular categories or classifications of a particular file format (e.g. legacy format 116, updated format 126, or an intermediate format), which is further detailed in connection with FIG. 5.

In one or more aspects of the claimed subject matter, monitor component 112 can further archive operation elements 410 necessary or useful to employ converter 118. In particular, as was discussed above in connection with aging or obsolescence of converters as well as that for the underlying legacy file format, the operation elements 410 associated with aging or obsolescent converters can be archived as well. By way of example, operation elements can include an application employed to execute converter 118, or all or a portion of an operating system necessary for executing converter 118 or the application. As another example, operation elements 410 can be an emulator for the application or the application and the necessary underlying operating system. Operation elements 410 can also be directed to settings or a registry associated with the application or the operating system or a product ID or stock keeper unit (SKU) associated with the application or the operating system.

Figure 5:
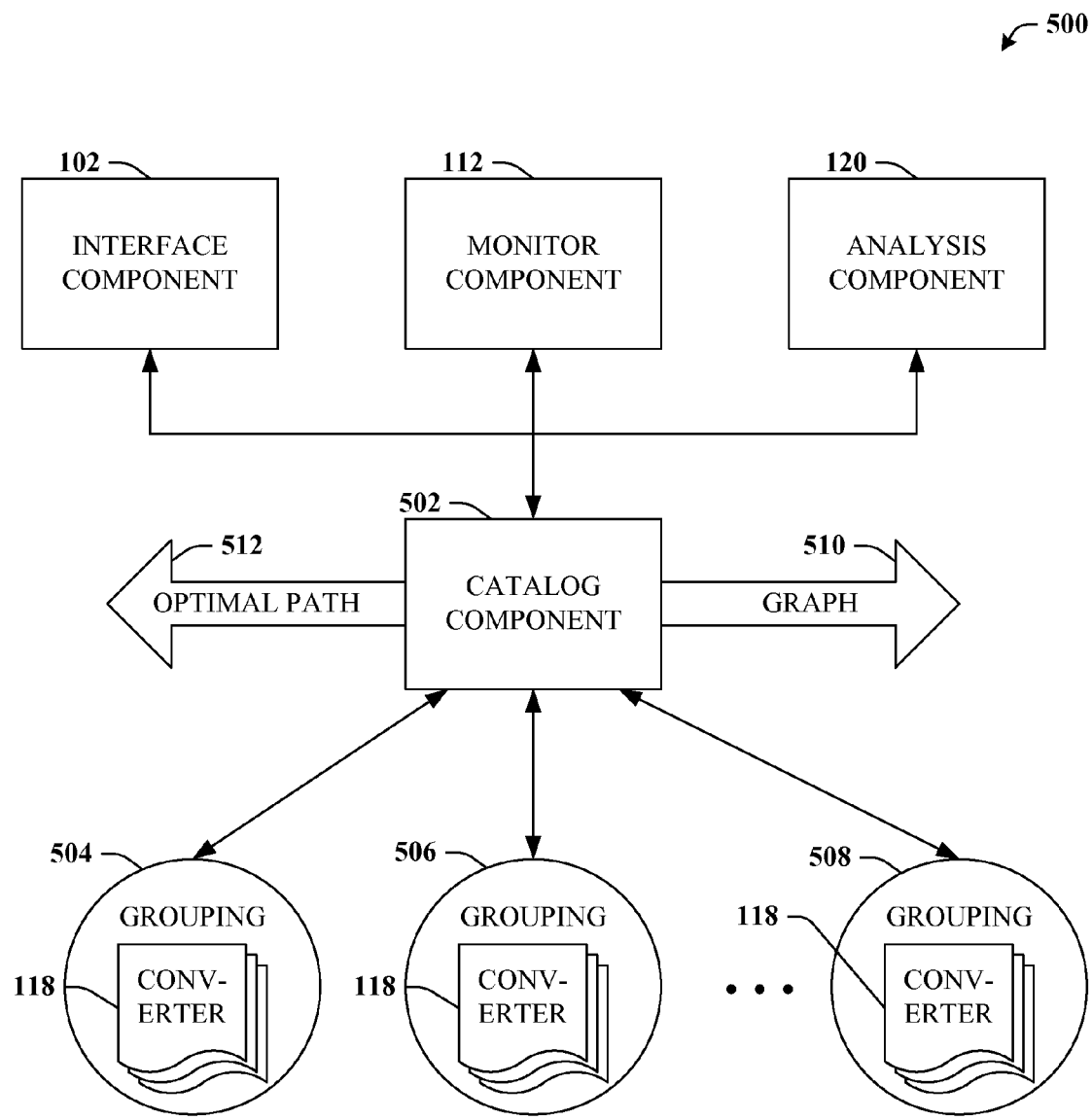
FIG. 5 illustrates a block diagram of a system that can classify converter groups in connection with determining costs associated with updating file formats.

Referring now to FIG. 5, system 500 that can classify converter groups in connection with determining costs associated with updating file formats is illustrated. In particular, system 500 can include interface component 102, monitor component 112, and analysis component 120 as substantially described supra. In addition, system 500 can include catalog 502 that can group or categorize converters 118 included in the set of converters accessible to monitor component 112 or other components described herein. Depicted here are three such groupings 504, 506, and 508, however, it should be appreciated that substantially any number of groups or groupings can exist. It should further be appreciated that catalog component 502 can organize or structure membership for one or more grouping 504-508 based upon or according to certain file formats, e.g. legacy format 116, updated format 126, or an intermediate format that can be arrived at when migration or conversion is a multi-step process and/or requires multiple converters 118.

In one or more aspects of the claimed subject matter, catalog component 502 can construct or maintain graph 510 in connection with, inter alia, ordering or grouping of converters 118. Graph 510 can include various nodes and edges connecting those nodes. More particularly, nodes of graph 510 can be associated with or represent file formats (e.g., legacy format 116, updated format 126, or an intermediate format). Likewise, edges of graph 510 can be associated with or represent converters 118 that yield the format represented by one node when provided the format represented by the other node.

According to one or more aspects of the claimed subject matter, catalog component 502 can further examine graph 510 in order to determine optimal path 512. For instance, optimal path 512 can represent an optimal ordered subset of converters from among the full set of converters 118 or a particular grouping of converters 118 to employ when constructing updated file 124 from legacy file 114. For example, in cases where multiple converters 118 are necessary to arrive at the updated format 126, it is possible that updated file 124 can be produced by two or collections of converters 118.

To provide an example illustration of the above features, consider an example legacy file that was originally disseminated in version 1.0 of a particular legacy file format. Over time, version 1.1 is created and then 1.2 is created, and so on until the most recent version of 2.0 is created. Conceivably, there could therefore be 10 different converters, one for updating version 1.0 to version 1.1, one for updating version 1.1 to version 1.2 and so on until the tenth converter that updates version 1.9 to version 2.0. In addition, other converters can exist, for example a converter that can update all previous version to version 1.5. Ultimately, catalog component can select optimal path 512 that includes the optimal set of registered converters 118. Appreciably, optimal path 512 can employ all or portions of cost-benefit 122 such that optimal path 512 need not necessarily be the shortest path, but what is most beneficial vis-à-vis identified costs to data storage service 104.

It should also be understood that in cases in which multiple converters 118 are utilized, such converters 118 need not necessarily be related as in the above example. For instance, consider the case in which legacy file 114 is a document with embedded file or other media or objects of a distinct file format. In some cases, the embedded file might require conversion as well to effectuate a proper updated file 124. Accordingly, it should be appreciated that all or portions of conversion or migration operations discussed herein can accomplished by way of recursive conversion cycles in order to, e.g. mitigate conversion failure due to embedded files.

Figure 6:
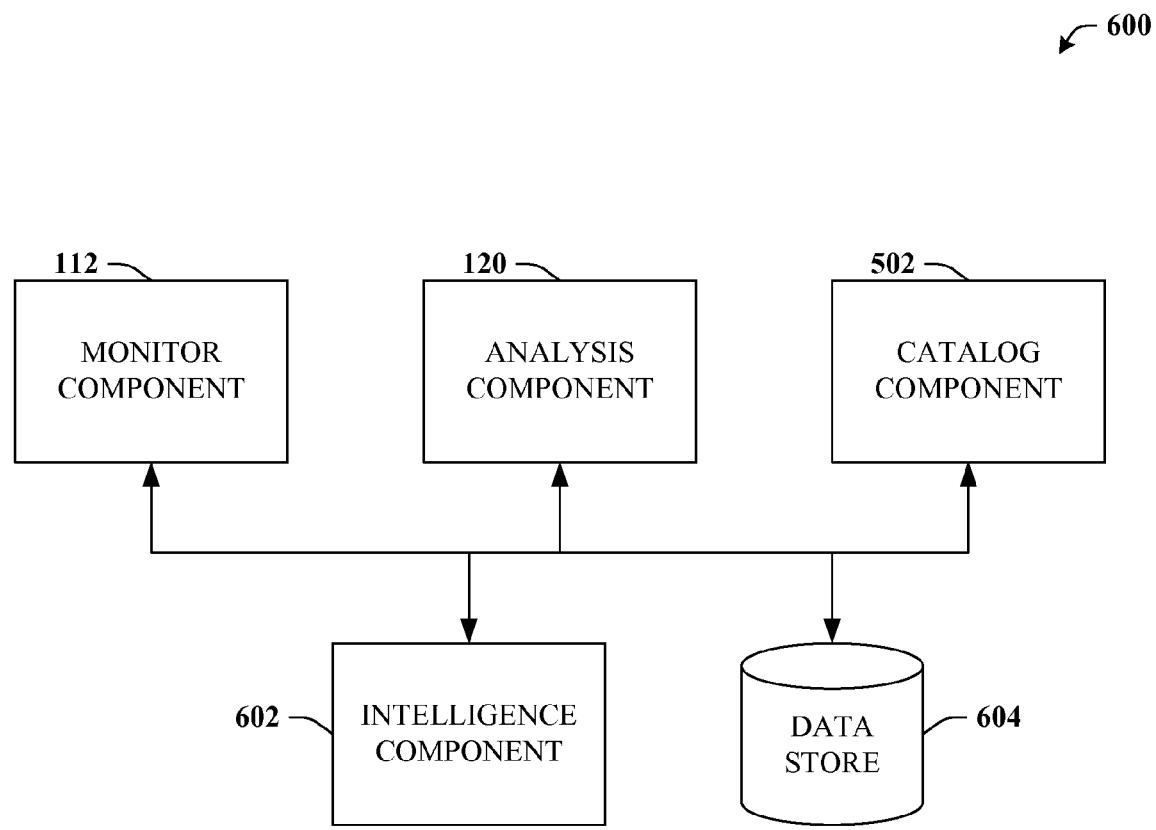
FIG. 6 is a block diagram of a system that can provide for or aid with various inferences or intelligent determinations.

Turning now to FIG. 6, system 600 that can provide for or aid with various inferences or intelligent determinations is depicted. Generally, system 600 can include monitor component 112, analysis component 120, or catalog component 502 as substantially described herein. In addition to what has been described, the above-mentioned components can make intelligent determinations or inferences. For example, monitor component 112 can intelligently determine or infer when a particular format becomes old, obsolete, and in particular volatile in order to identify legacy format 114. Moreover, monitor component 112 can also determine or infer forecasted longevity of an updated format 126 in order to select a suitable or optimal converter 118. Likewise, analysis component 120 can intelligently determine or infer numerous factors associated with cost-benefit 122. For example, forecasted retrieval frequency 330 can be inferred as well as a weight to assign various factors when determining cost-benefit 122 from multiple factors. Catalog component 502 can intelligently classify various converters as well as intelligently choose optimal path 512 from amongst several possible paths. Appreciably, any of the foregoing inferences can potentially be based upon, e.g. Bayesian probabilities or confidence measures or based upon machine learning techniques related to historical analysis, feedback, and/or previous other determinations or inferences.

In addition, system 600 can also include intelligence component 602 that can provide for or aid in various inferences or determinations. In particular, in accordance with or in addition to what has been described supra with respect to intelligent determination or inferences provided by various components described herein. For example, all or portions of monitor component 112, analysis component 120, or catalog component 502 (as well as other components described herein) can be operatively coupled to intelligence component 602. Additionally or alternatively, all or portions of intelligence component 602 can be included in one or more components described herein. Moreover, intelligence component 602 will typically have access to all or portions of data sets described herein, such as previous or intermediate inferences, data relating to market factors associated with a particular file format, and so forth. Such data sets or other information can be included in data store 604.

Thus, intelligence component 602, as well as system 100 (or components therein) can also include or be operatively connected to data store 604. Largely, data store 604 is intended to be a repository of all or portions of data, data sets, or information described herein or otherwise suitable for use with the claimed subject matter. Data store 604 can be centralized, either remotely or locally cached, or distributed, potentially across multiple devices and/or schemas. Furthermore, data store 604 can be embodied as substantially any type of memory, including but not limited to volatile or non-volatile, sequential access, structured access, or random access and so on. It should be understood that all or portions of data store 128 can be included in system 100, or can reside in part or entirely remotely from system 100.

In accordance with the above, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
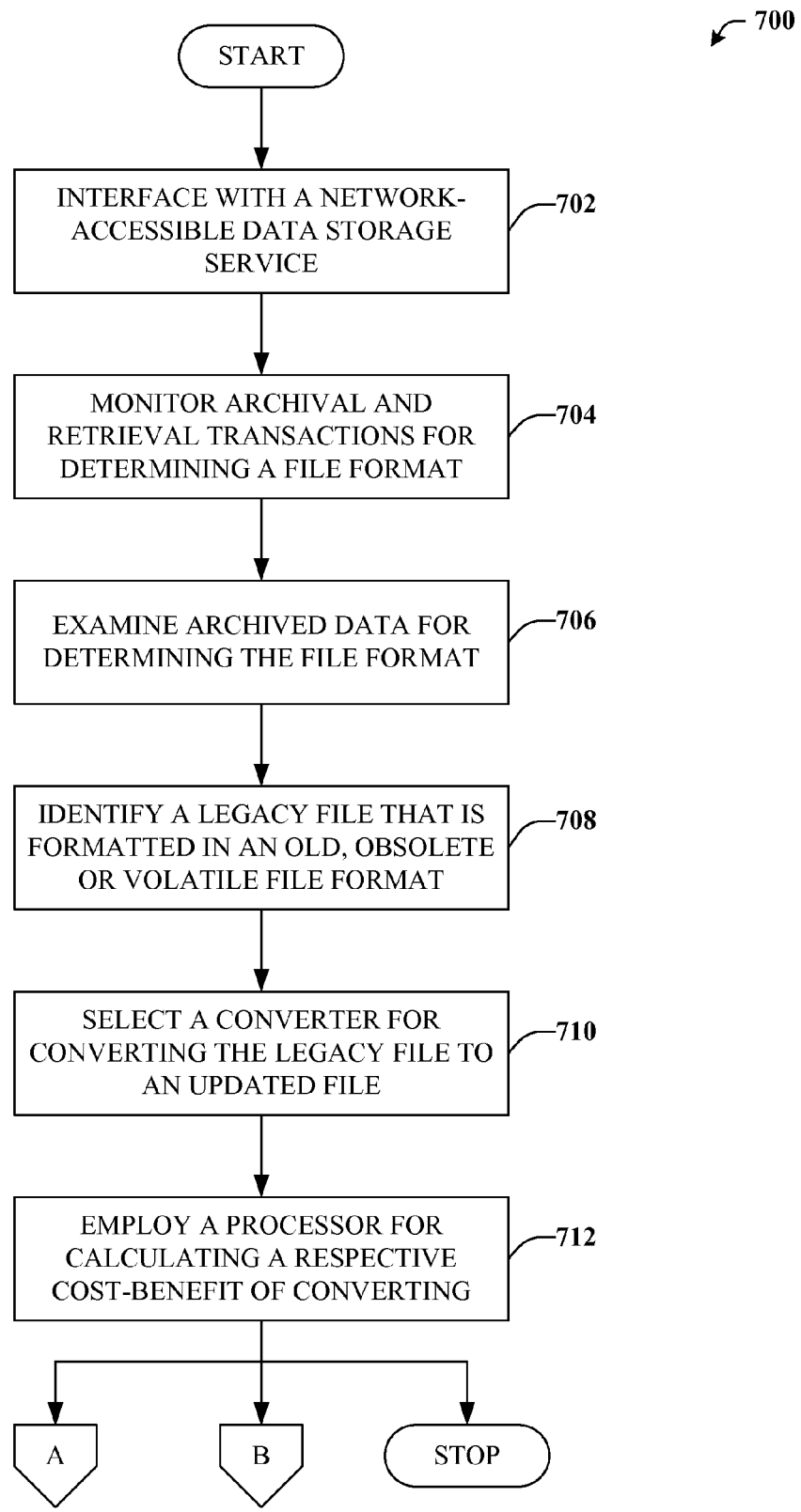
FIG. 7 depicts an exemplary flow chart of procedures that define a method for determining costs associated with updating file formats.
Figure 8:
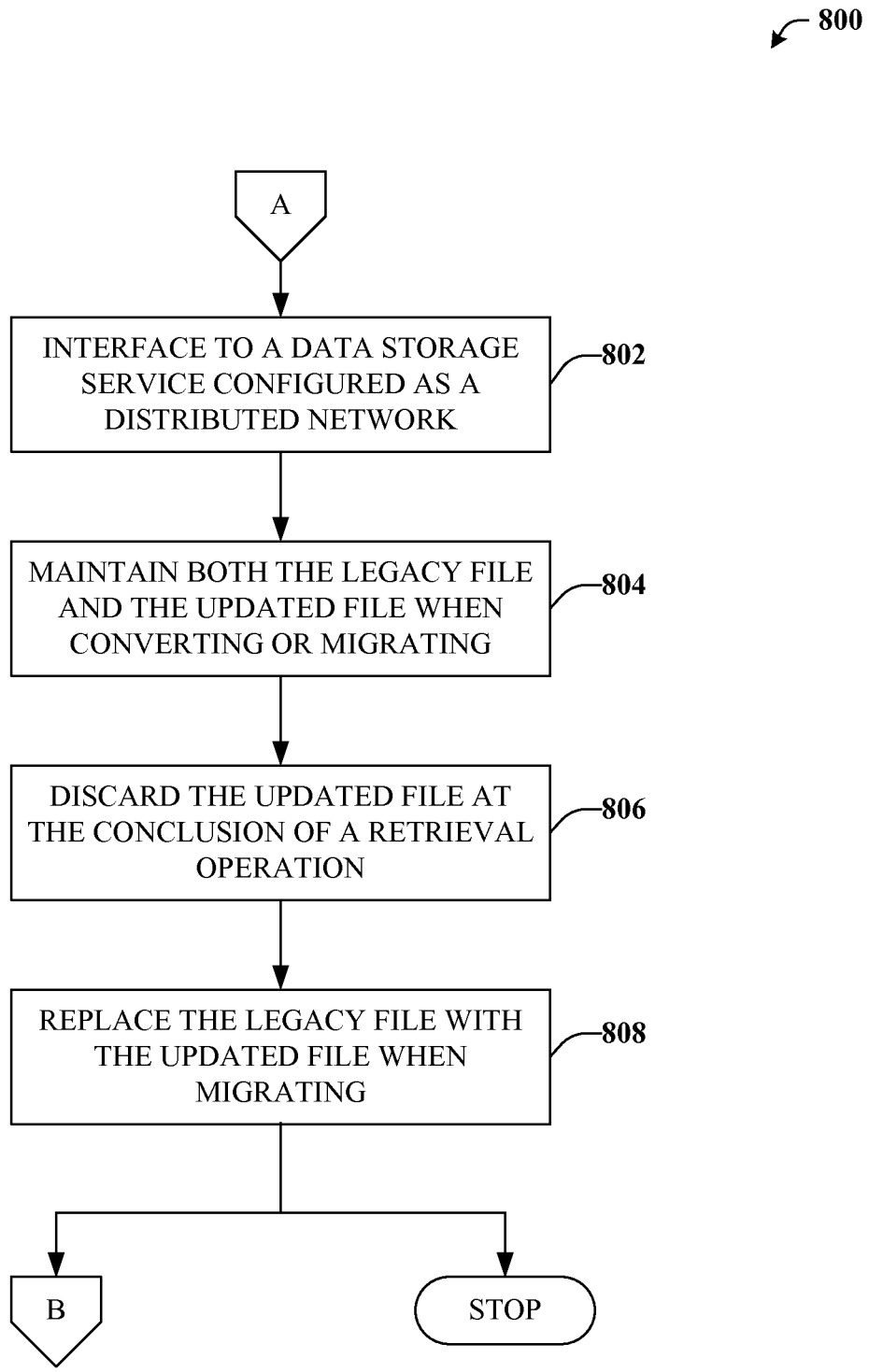
FIG. 8 illustrates an exemplary flow chart of procedures that define a method for various conversion cases when determining costs associated with updating file formats.
Figure 9:
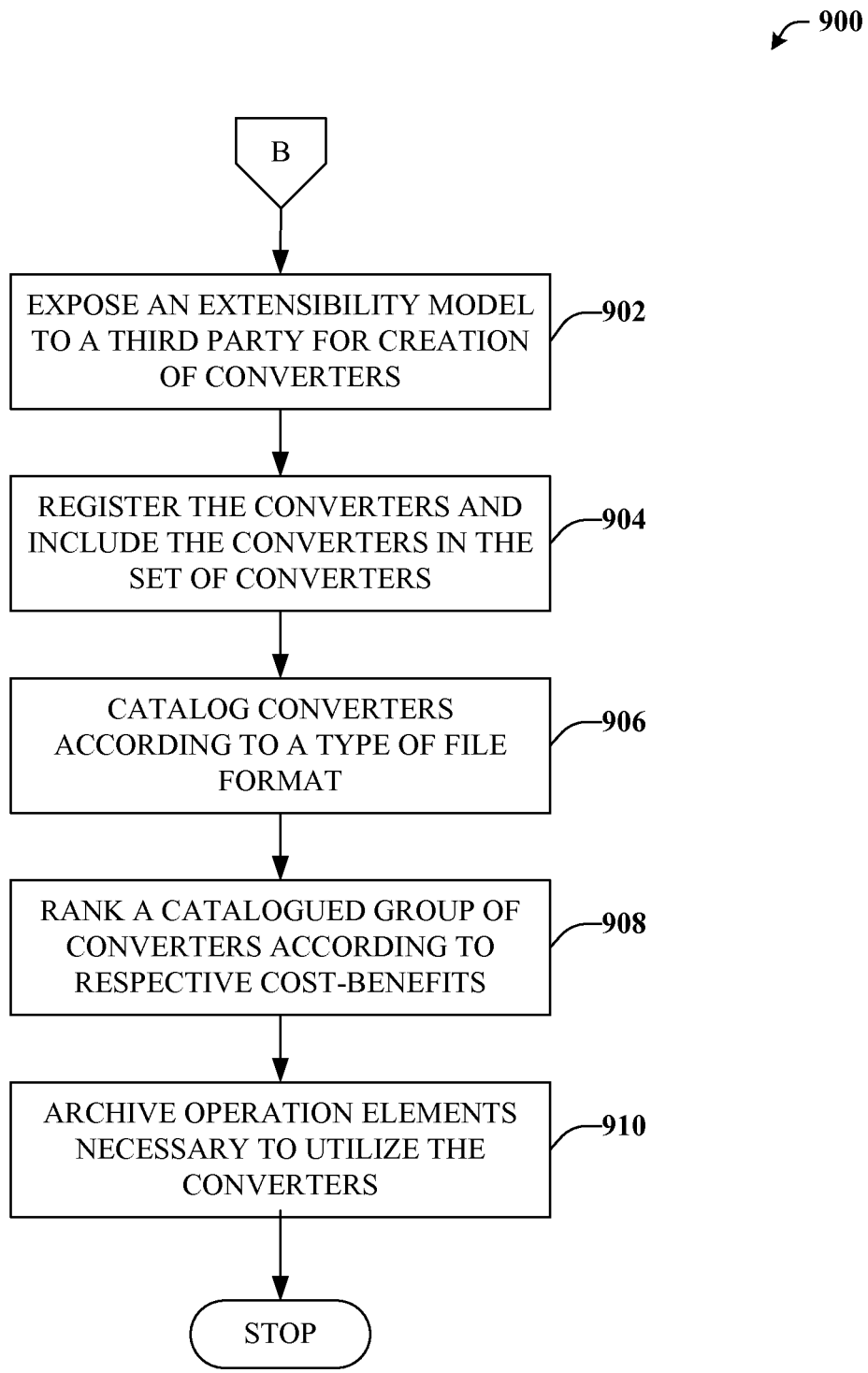
FIG. 9 depicts an exemplary flow chart of procedures defining a method for providing addition features in connection with determining costs associated with updating file formats.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary computer implemented method 700 for determining costs associated with updating file formats is provided. Generally, at reference numeral 702, a network-accessible data storage service facilitating both archival of data associated with a user and retrieval of archived data can be interfaced. Appreciably, the interfacing with the data storage service can be based on a topology of the data storage service and can be especially configured to conform to a distributed network storage environment.

At reference numeral 704, archival transactions or retrieval transactions (or both) between the data storage service and the user can be monitored for identifying a file format in connection with the archival or retrieval transaction. Similarly, at reference numeral 706, the archived data can be examined for identifying the file format in connection with a file included in the archived data. In other words, at reference numeral 704, formats for files associated with a retrieval or archival transaction can be identified, whereas at reference numeral 706, formats for files already in the data base (yet not necessarily the subject of a retrieval transaction) can be identified.

Regardless, at reference numeral 708, some file formats identified at reference numerals 704 or 706 can be classified as a legacy format and/or the associated file as a legacy file. Classification of the file as a legacy file can occur when the legacy file is formatted in an old, obsolete or volatile file format. Appreciably, at reference numeral 710, a converter from a set of converters can be selected for producing an updated file with an updated format based upon the legacy file. It should be understood that selection of the converter can be a multi-step process, with each pass narrowing the set of converters based upon various criteria. Moreover, it should also be understood that multiple converters can be or might necessarily be required for producing the updated file from the legacy file. Accordingly, selection of the converter can involve selection of multiple converters.

At reference numeral 712, a processor can be employed for calculating a respective-cost-benefit to the data storage service for each one of multiple conversion cases, wherein each conversion case relates to employing the selected converter for conversion or migration of the legacy file to the updated file. Generally, conversion relates to maintaining the legacy file even after the updated file is created, with the updated file either maintained as well or discarded. On the other hand, migration relates to discarding the legacy file and/or replacing or overwriting the legacy file with the updated file, which is further detailed in connection with FIG. 8.

Referring to FIG. 8, exemplary computer implemented method 800 for providing for various conversion cases when determining costs associated with updating file formats is depicted. At reference numeral 802, the interfacing discussed in connection with reference numeral 702 is expressly to a host data storage service that is configured as a distributed network or a mesh network, wherein multiple peers in a set of peers composing the network each include a respective portion of the archived data. Appreciably, each respective portion can be mutually exclusive, unique, or a substantial replication of another portion.

At reference numeral 804, the processor utilized for calculating a respective cost-benefit detailed in connection with reference numeral 712 can be further utilized for converting the legacy file to the updated file while maintaining both the legacy file and the updated file in the archived data. Appreciably, reference numeral 804 corresponds to a first conversion case.

On the other hand, at reference numeral 806, the processor can be utilized for converting the legacy file to the updated file while discarding the updated file at the conclusion of an associated retrieval transaction. Appreciably, reference numeral 806 corresponds to a second conversion case, typically applicable when legacy file is identified during a retrieval transaction or request.

Additionally or alternatively, at reference numeral 808, the processor can be utilized for migrating the legacy file to the updated file by replacing or overwriting the legacy file in the archived data with the updated file or by discarding the legacy file and inserting the updated file in the archived data. Appreciably, reference numeral 808 corresponds to a migration case that is applicable in the first instance to identifying the legacy file during a retrieval transactions or when legacy file is identified in the archived data; or applicable in the second instance when the legacy file is identified during an archival transaction.

With reference now to FIG. 9, method 900 for providing addition features in connection with determining costs associated with updating file formats is illustrated. At reference numeral 902, an extensibility model can be exposed to a third party for facilitating creation of one or more converters by the third party. The extensibility model can relate to or include a set of APIs that can be employed by the third party to design converters that can operate in the context of the data storage service or conform to an architecture or topology of the data storage service, such as facilitating conversion or migration in a distributed networking or storage environment.

At reference numeral 904, the one or more converters created by the third party in connection with reference numeral 902, as well as other converters such as those created by the data storage service, can be registered. Moreover, registered converters can be included in the set of converters from which the converter for converting the legacy file to the updated file detailed at reference numeral 710 can be selected.

Next to be described, at reference numeral 906, the set of converters can be cataloged according to a type of file format for the legacy file or the updated file. Furthermore, the set of converters can be cataloged according to a type of file format for an intermediate format that can define an intermediate file in the process of converting to the updated file from the legacy file. In addition, at reference numeral 908, a catalogued group of converters included in the set of converters can be ranked according to respective cost-benefits of utilizing respective converters included in the group for migration or conversion of the legacy file.

Furthermore, at reference numeral 910, operation elements necessary for or beneficial to utilizing the converter can be archived as well, potentially along with the archived data or elsewhere. The operation elements archived at reference numeral 910 can relate to or include at least one of an application, all or a portion of an operating system, or an emulator for the application or the application and all or a portion of the operating system, settings or a registry associated with the application or the operating system, or a product ID associated with the application or the operating system.

Figure 10:
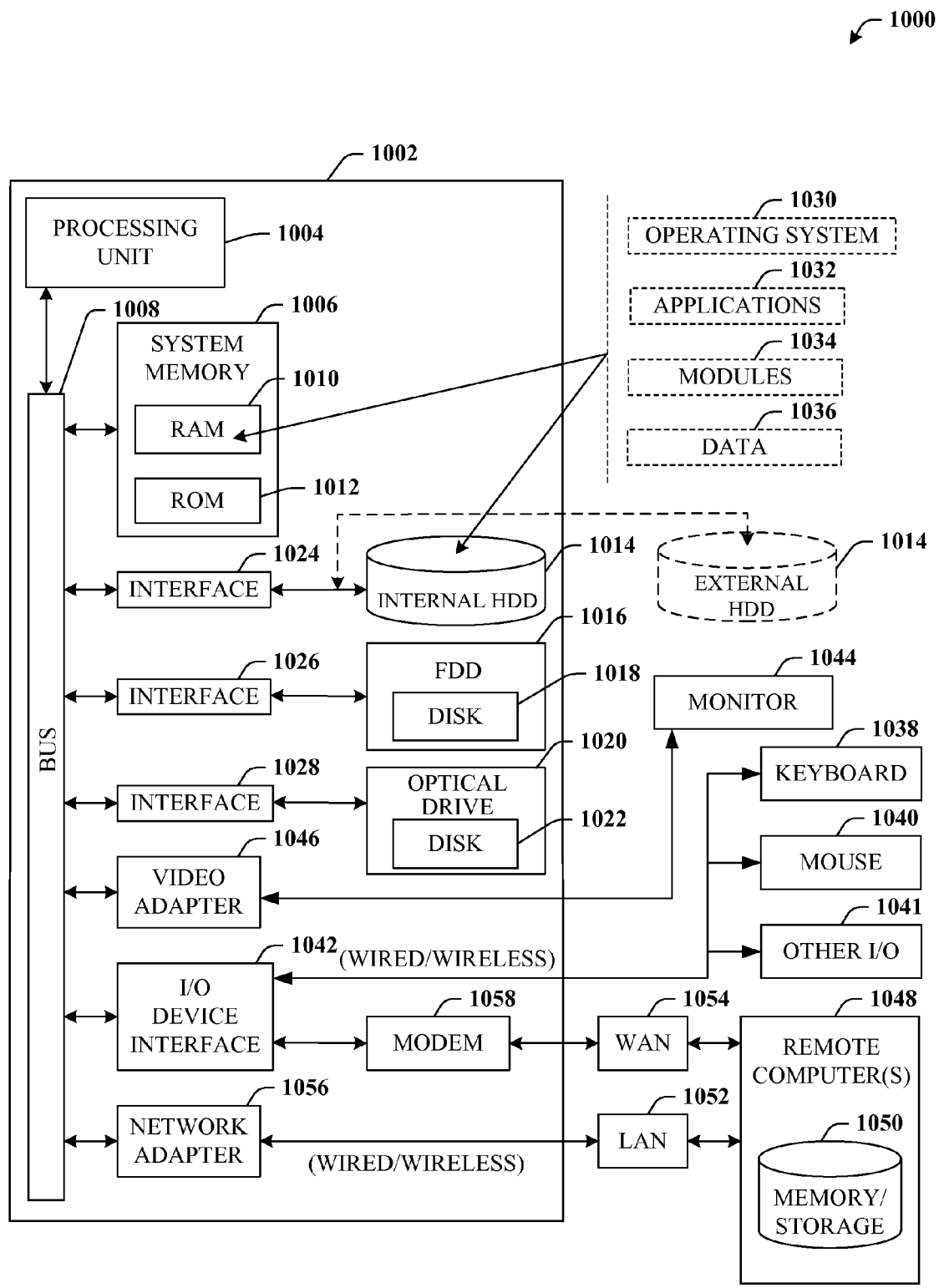
FIG. 10 illustrates a block diagram of a computer operable to execute or implements all or portions of the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules or components can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices 1041 may include a speaker, a microphone, a camera or another imaging device, an IR remote control, a joystick, a game pad, a stylus pen, touch screen, or the like. These and other input devices are often connected to the processing unit 1004 through an input-output device interface 1042 that can be coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10 BaseT" wired Ethernet networks used in many offices.

Figure 11:
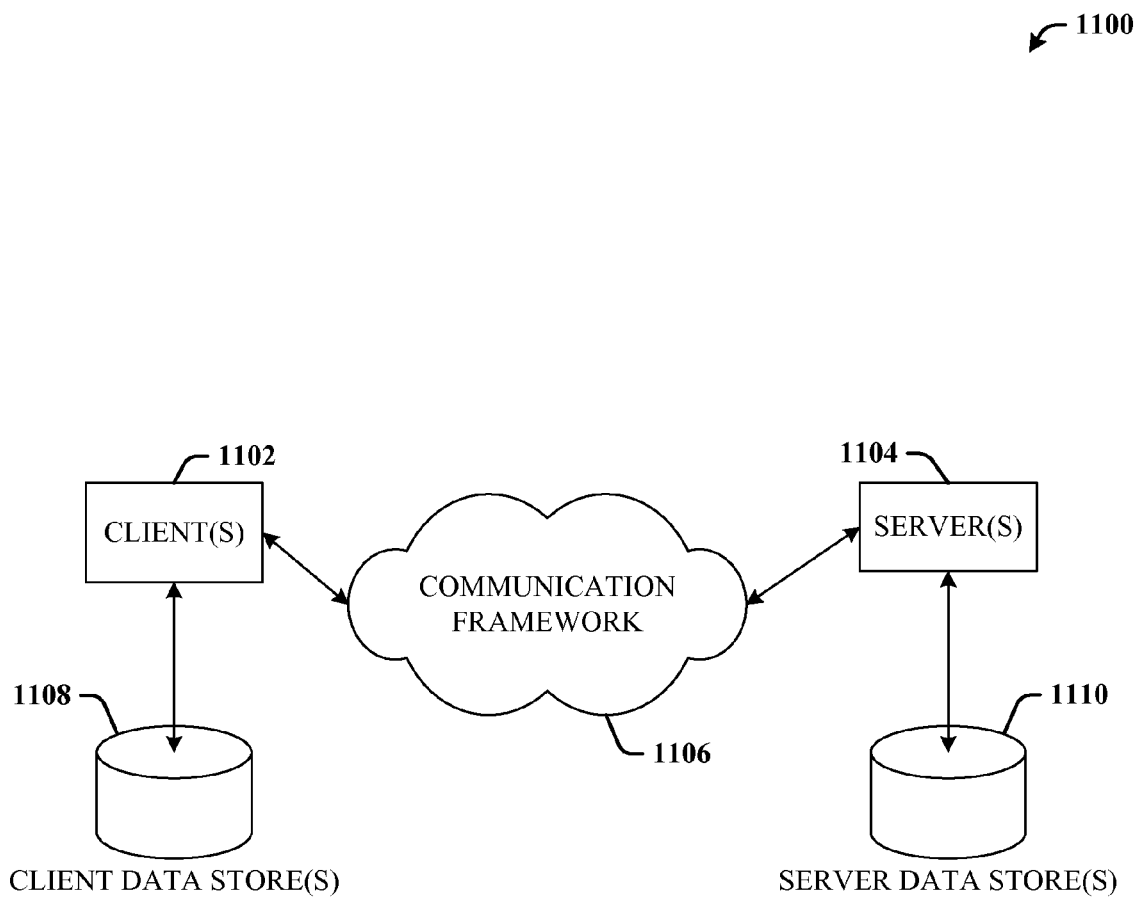
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that determines costs associated with updating file formats, the system comprising at least a processor and a memory, and further comprising:
an interface component that interfaces with a network-accessible data storage service that facilitates archival of data associated with a user and retrieval of archived data;
a monitor component that examines the archived data, and monitors archival transactions and retrieval transactions involving the data storage service, the monitor component identifying a legacy file formatted in a legacy format without the user being aware of a location of the legacy file, the monitor component identifying the legacy file based upon detection that the legacy file is configured in the legacy format, the monitor component further selecting plural optimal converters from a set of converters according to an optimal path, the selection comprising selecting a first optimal converter for converting or migrating the legacy file from a legacy file format version to an intermediate file format version, and a second optimal converter for converting or migrating the legacy file from the intermediate file format version to an updated file format version;
a catalog component that determines the optimal path from a plurality of paths for constructing the updated file from the legacy file; and
an analysis component that determines a respective cost-benefit to the data storage service for each of a plurality of conversion scenarios utilizing optimal converters for migration or conversion of the legacy file to an updated file with an updated format, the migration replacing the legacy file with the updated file and the conversion constructing the updated file that is distinct from the legacy file and upon determining a cost-benefit analysis, the analysis component facilitates creation of the updated file from the legacy file using the selected plural optimal converters.

2. The system of claim 1, the data storage service is configured as a distributed or a mesh network with a set of peers, at least two peers from the set of peers storing a portion of the archived data.

3. The system of claim 1, the data storage service maintains a network accessible data repository that hosts at least a portion of the archived data.

4. The system of claim 1, the analysis component facilitates a conversion of the legacy file to the updated file and maintains both the legacy file and the updated file in the archived data.

5. The system of claim 1, the analysis component facilitates a conversion of the legacy file to the updated file and discards the updated file after completion of a retrieval transaction.

6. The system of claim 1, the plurality of conversion scenarios includes at least one of (1) conversion of the legacy file to the updated file when the monitor component identifies the legacy file within the archived data, (2) migration of the legacy file to the updated file when the monitor component identifies the legacy file within the archived data, (3) conversion of the legacy file to the updated file when the monitor component identifies the legacy file during an archival transaction, (4) migration of the legacy file to the updated file when the monitor component identifies the legacy file during an archival transaction, (5) conversion of the legacy file to the updated file when the monitor component identifies the legacy file during a retrieval transaction, and (6) migration of the legacy file to the updated file when the monitor component identifies the legacy file during a retrieval transaction.

7. The system of claim 1, the analysis component determines the respective cost-benefit based on at least one of (1) an economic cost associated with the migration or conversion of the legacy file to the updated file, (2) an economic cost associated with the migration or conversion of other legacy files included in the archived data with a substantially similar format as the legacy file, (3) a number of other updated files included in the archived data with a substantially similar format as the updated file, (4) a number of other legacy files or a number of other updated files, (5) a historical or inferred frequency of retrieval transactions associated with the legacy file, (6) an efficiency change for the migration relative to the conversion, (7) a time required for the migration or the conversion of the legacy file or the other legacy files, (8) a time-value function in connection with the legacy file or the archived data, (9) an inference associated with a longevity of the updated format, and (10) whether the updated file is lossless or lossy with respect to the legacy file.

8. The system of claim 1, the interface component exposes a set of tools to a third party entity, the set of tools facilitates design of converters that produce updated files from legacy files in accordance with an architecture of the data storage service.

9. The system of claim 8, the monitor component registers the designed converters and includes the designed converters in the set of converters.

10. The system of claim 9, the monitor component further ranks converters included in the set of converters based upon respective cost-benefits associated with each converter.

11. The system of claim 1, the monitor component further archives operation elements necessary to utilize the optimal converters, the operation elements include at least one of an application, all or a portion of an operating system, an emulator for the application or the application and all or a portion of the operating system, settings or a registry associated with the application or the operating system, and a product ID associated with the application or the operating system.

12. The system of claim 1, wherein the catalog component groups or categorizes converters included in the set of converters based upon the legacy format, the updated format, or an intermediate format.

13. The system of claim 12, wherein the catalog component maintains a graph with nodes that represent file formats and edges that represent converters.

14. The system of claim 13, wherein the optimal path is not the shortest path of the plurality of paths for constructing the updated file from the legacy file.

15. The system of claim 1, the updated format is a current or recent version of the legacy format.

16. The system of claim 1, the updated format is a simple format that has historically shown robust longevity or is inferred to have robust longevity.

17. A computer implemented method for determining costs associated with updating file formats, comprising:
  interfacing with a network-accessible data storage service facilitating archival of data associated with a user and retrieval of archived data;
  monitoring archival transactions and retrieval transactions involving the data storage service for identifying a file format in connection with the archival transactions or retrieval transactions;
  examining the archived data for identifying the file format in connection with a file included in the archived data;
  identifying a legacy file that is formatted in a legacy file format based upon detecting that the legacy file is configured in the legacy file format;
  identifying an optimal path from a plurality of paths for constructing the updated file from the legacy file;
  selecting plural optimal converters from a set of converters according to the optimal path, the selection comprising selecting a first optimal converter for converting or migrating the legacy file from the legacy file format to an intermediate file format, and a second optimal converter for converting or migrating the legacy file from the intermediate file format to an updated file format where the legacy and intermediate file formats correspond with earlier versions of software; and
  employing a processor for calculating a respective cost-benefit to the data storage service for each one of multiple conversion cases for employing optimal converters for conversion or migration of the legacy file to the updated file, the migration replacing the legacy file with the updated file and the conversion constructing the updated file that is distinct from the legacy file.

18. The method of claim 17, further comprising at least one of the following acts:
  interfacing to the data storage service that is configured as a distributed network or a mesh network with a set of peers, at least two peers in the set of peers composing the network include a respective portion of the archived data;
  utilizing the processor for converting the legacy file to the updated file and maintaining both the legacy file and the updated file in the archived data;
  utilizing the processor for converting the legacy file to the updated file and discarding the updated file at conclusion of an associated retrieval transaction; and
  utilizing the processor for migrating the legacy file to the updated file by replacing the legacy file in the archived data with the updated file or by discarding the legacy file and inserting the updated file into the archived data.

19. The method of claim 17, further comprising at least one of the following acts:
  exposing an extensibility model to a third party for facilitating creation of one or more converters by the third party;
  registering the one or more converters and including the one or more converters in the set of converters;
  cataloging the set of converters according to a type of file format for the legacy file or the updated file;
  ranking a catalogued group of converters included in the set of converters according to respective cost-benefits of utilizing respective converters included in the catalogued group for the conversion or migration of the legacy file; and
  archiving operation elements necessary to utilize the optimal converters, the operation elements including at least one of an application, all or a portion of an operating system, an emulator for the application or the application and all or a portion of the operating system, settings or a registry associated with the application or the operating system, and a product ID associated with the application or the operating system.

20. A computer-readable storage device bearing computer-executable instructions that, when executed on a computer system comprising at least a processor and a memory, carry out a method for determining costs associated with updating file formats, comprising:

interfacing with a network-accessible data storage service facilitating archival of data associated with a user and retrieval of archived data;

monitoring archival transactions and retrieval transactions involving the data storage service for identifying a file format in connection with the archival transactions or retrieval transactions;

examining the archived data for identifying the file format in connection with a file included in the archived data;

identifying a legacy file that is formatted in a legacy file format based upon detecting that the legacy file is configured in the legacy file format;

identifying an optimal path from a plurality of paths available by a catalog component for constructing the updated file from the legacy file;

selecting plural optimal converters from a set of converters according to the optimal path, the selection comprising selecting a first optimal converter for converting or migrating the legacy file from the legacy file format to an intermediate file format, and a second optimal converter for converting or migrating the legacy file from the intermediate file format to an updated file format where the legacy and intermediate file formats correspond with earlier versions of software; and employing a processor for calculating a respective cost-benefit to the data storage service for each one of multiple conversion cases for employing optimal converters for conversion or migration of the legacy file to the updated file, the migration replacing the legacy file with the updated file and the conversion constructing the updated file that is distinct from the legacy file.

* * * * *